United States Patent
Biskeborn et al.

(10) Patent No.: US 9,799,355 B1
(45) Date of Patent: Oct. 24, 2017

(54) HIGH ACCURACY TAPE BEARING SURFACE LENGTH DEFINITION PROCESS FOR TAPE HEAD FABRICATION

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/297,002

(22) Filed: Oct. 18, 2016

(51) Int. Cl.
 G11B 5/187 (2006.01)
 G11B 5/31 (2006.01)
 G11B 5/008 (2006.01)

(52) U.S. Cl.
 CPC ........ G11B 5/3169 (2013.01); G11B 5/00813 (2013.01); G11B 5/3116 (2013.01)

(58) Field of Classification Search
 None
 See application file for complete search history.

(56) References Cited

U.S. PATENT DOCUMENTS

| | | | |
|---|---|---|---|
| 4,624,048 A | 11/1986 | Hinkel et al. | |
| 5,718,035 A | 2/1998 | Yamanaka et al. | |
| 6,081,991 A | 7/2000 | Tsunoda et al. | |
| 7,167,339 B2 | 1/2007 | Biskeborn et al. | |
| 8,351,162 B2 | 1/2013 | Etoh et al. | |
| 8,675,310 B2* | 3/2014 | Biskeborn | G11B 5/584 360/121 |
| 9,704,514 B1 | 7/2017 | Biskeborn et al. | |
| 9,711,170 B1 | 7/2017 | Biskeborn et al. | |
| 2002/0094758 A1 | 7/2002 | Reiley et al. | |
| 2003/0076631 A1* | 4/2003 | Torline | G11B 5/10 360/129 |
| 2004/0223261 A1* | 11/2004 | Deshpande | G11B 5/105 360/234.7 |
| 2005/0122631 A1* | 6/2005 | Biskeborn | G11B 5/39 360/313 |
| 2005/0128638 A1* | 6/2005 | Koeppe | G11B 5/127 360/128 |

(Continued)

FOREIGN PATENT DOCUMENTS

JP 11214588 A * 8/1999 ............. H01L 24/97

OTHER PUBLICATIONS

Biskeborn et al., U.S. Appl. No. 15/289,002, filed Oct. 7, 2016.

(Continued)

*Primary Examiner* — Will J Klimowicz
(74) *Attorney, Agent, or Firm* — Zilka-Kotab, P.C.

(57) ABSTRACT

In one general embodiment, a method includes forming a slot on a tape bearing surface of at least a chip having a thin film layer with a plurality of transducers therein, the slot defining a skiving edge. A second operation is performed on the tape bearing surface of at least the chip for removing a portion of the chip positioned on an opposite side of the slot as the transducers. In another general embodiment, an apparatus includes a substrate, a thin film layer on the substrate having transducers therein, and a portion of a slot extending along the substrate, the portion of the slot defining a skiving edge. A length of a tape bearing surface between the substrate and the skiving edge is in a range of about 7 to about 30 microns.

17 Claims, 11 Drawing Sheets

(56) References Cited

U.S. PATENT DOCUMENTS

| | | | | |
|---|---|---|---|---|
| 2005/0168874 A1* | 8/2005 | Biskeborn | .............. | G11B 5/584 360/241.1 |
| 2006/0292968 A1 | 12/2006 | Fujii | | |
| 2007/0047141 A1* | 3/2007 | Biskeborn | .......... | G11B 5/00826 360/129 |
| 2008/0049358 A1* | 2/2008 | Biskeborn | ............ | G11B 5/1872 360/128 |
| 2014/0087089 A1* | 3/2014 | Biskeborn | ............ | G11B 5/3163 427/552 |

OTHER PUBLICATIONS

Biskeborn et al., U.S. Appl. No. 15/289,030, filed Oct. 7, 2016.
Biskeborn et al., U.S. Appl. No. 15/333,034, filed Oct. 24, 2016.
Biskeborn et al., U.S. Appl. No. 15/369,651, filed Dec. 5, 2016.
Restriction Requirement from U.S. Appl. No. 15/289,030, dated Dec. 6, 2016.
Restriction Requirement from U.S. Appl. No. 15/289,002, dated Dec. 7, 2016.
Restriction Requirement from U.S. Appl. No. 15/333,034, dated Jan. 5, 2017.
Notice of Allowance from U.S. Appl. No. 15/289,002, dated Mar. 2, 2017.
Notice of Allowance from U.S. Appl. No. 15/289,030, dated Mar. 10, 2017.
Supplemental Notice of Allowance from U.S. Appl. No. 15/289,030, dated Mar. 27, 2017.
Corrected Notice of Allowance from U.S. Appl. No. 15/289,002, dated Apr. 5, 2017.
Ex Parte Quayle from U.S. Appl. No. 15/333,034, Mar. 30, 2017.
Biskeborn et al., U.S. Appl. No. 15/488,272, filed Apr. 14, 2017.
Supplemental Notice of Allowance from U.S. Appl. No. 15/289,002, dated May 9, 2017.
Supplemental Notice of Allowance from U.S. Appl. No. 15/289,030, dated May 9, 2017.
Notice of Allowance from U.S. Appl. No. 15/333,034, dated May 24, 2017.
Supplemental Notice of Allowance from U.S. Appl. No. 15/289,030, dated Jun. 5, 2017.
Supplemental Notice of Allowance from U.S. Appl. No. 15/333,034, dated Jun. 7, 2017.
Supplemental Notice of Allowance from U.S. Appl. No. 15/289,002, dated Jun. 8, 2017.
Restriction Requirement from U.S. Appl. No. 15/488,272, dated Jul. 19, 2017.
Supplemental Notice of Allowance from U.S. Appl. No. 15/333,034, dated Jul. 25, 2017.

* cited by examiner

HIGH ACCURACY TAPE BEARING SURFACE LENGTH DEFINITION PROCESS FOR TAPE HEAD FABRICATION

BACKGROUND

The present invention relates to fabrication of magnetic heads, and more particularly, this invention relates to defining a tape bearing surface on a magnetic tape head.

Many modern electronic components are created by thin film wafer processing. One category of component created by thin film processing is the tape head. Another category is the disk head.

Most tape heads are currently built on wafers using thin film processes, similar to the wafers used for fabricating disk heads. However, the operating efficiency of disk heads and tape heads are inherently different. Disk recording/reading is very efficient, as the disk media is extremely flat and smooth, has a very thin magnetic layer, is in a sealed environment, and the heads are constructed to function with a particular media. Writing and reading tapes must address very different challenges. For example, the head should work with different tape brands, which can have different physical and magnetic properties. Furthermore, most tape is composed of magnetic particles, which are coated onto the tape surface. The resulting media can have variations in coating thickness and particle dispersion. This, coupled with spacing loss variations due to embedded wear particles and debris, requires that magnetic bits in tape be much larger than bits in disk media for achieving an acceptable signal-to-noise ratio.

Disk drive heads are designed to fly over smooth disk surfaces in a controlled manner at speeds exceeding 30 to 40 meters per second. By contrast, tape stacking and other requirements limit tape drive operating speeds to approximately 5 to 10 meters per second. Thus, to achieve data rates commensurate with disk drives, high performance linear tape drives typically employ heads having multiple transducers that operate simultaneously. For example, two transducers provide twice the data rate of one transducer, and modern heads have 32 transducers for each direction.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

For example, tolerances decrease as feature size decreases. Moreover, smaller components tend to be more fragile than their larger predecessors.

SUMMARY

A method according to one embodiment includes forming a slot on a tape bearing surface of at least a chip having a thin film layer with a plurality of transducers therein, the slot defining a skiving edge. A second operation is performed on the tape bearing surface of at least the chip for removing a portion of the chip positioned on an opposite side of the slot as the transducers.

A method according to another embodiment includes coupling closures to a section of a thin film wafer having a plurality of rows of transducers formed on a substrate, the closures being coupled to the section on an opposite side of the transducers as the substrate. An end of the section is lapped for polishing the end of the section and the closure. A row is sliced from the section, the row having the polished end. Optical detection of a reflective feature on the polished end is used to determine a location for a slot, which is then formed in the polished end at the determined location. A tape bearing surface is defined between the slot and portions of the transducers visibly exposed on the polished end. A portion of the polished end located on an opposite side of the slot as the transducers is removed from the row or segment thereof, An apparatus according to one embodiment includes a substrate, a thin film layer on the substrate having transducers therein, and a portion of a slot extending along the substrate, the portion of the slot defining a skiving edge. A length of a tape bearing surface between the substrate and the skiving edge is in a range of about 7 to about 30 microns.

Any of these embodiments may be implemented to fabricate a magnetic head usable with a magnetic data storage system such as a tape drive system, which may include the magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several embodiments for producing tape heads having a precisely-positioned tape bearing surface edge.

In one general embodiment, a method includes forming a slot on a tape bearing surface of at least a chip having a thin film layer with a plurality of transducers therein, the slot defining a skiving edge. A second operation is performed on the tape bearing surface of at least the chip for removing a portion of the chip positioned on an opposite side of the slot as the transducers.

In another general embodiment, a method includes coupling closures to a section of a thin film wafer having a plurality of rows of transducers formed on a substrate, the closures being coupled to the section on an opposite side of the transducers as the substrate. An end of the section is lapped for polishing the end of the section and the closure. A row is sliced from the section, the row having the polished end. Optical detection of a reflective feature on the polished end is used to determine a location for a slot, which is then formed in the polished end at the determined location. A tape bearing surface is defined between the slot and portions of the transducers visibly exposed on the polished end. A portion of the polished end located on an opposite side of the slot as the transducers is removed from the row or segment thereof, In yet another general embodiment, an apparatus includes a substrate, a thin film layer on the substrate having transducers therein, and a portion of a slot extending along the substrate, the portion of the slot defining a skiving edge. A length of a tape bearing surface between the substrate and the skiving edge is in a range of about 7 to about 30 microns.

Figure 1:
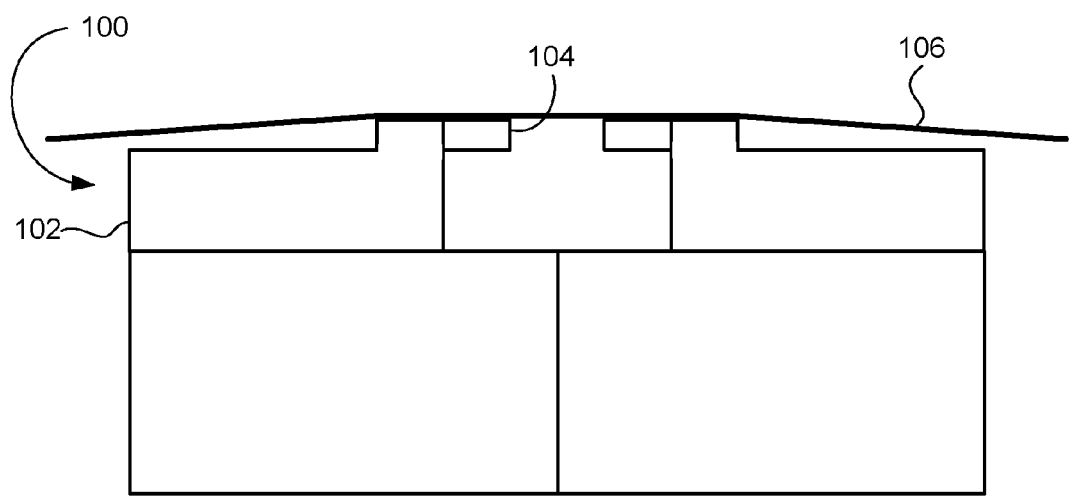
FIG. 1 is a side view of a tape head having closures.

One category of component created by thin film processing is the tape head. FIG. 1 depicts one such tape head 100. The head 100 includes a pair of head portions 102, each having a closure 104 that engages the tape 106 as it passes over the tape bearing surface of the head 100. The tape bearing surfaces may angle upwardly (towards the tape) so the tape wraps both substrate and closure edges.

Figure 2:
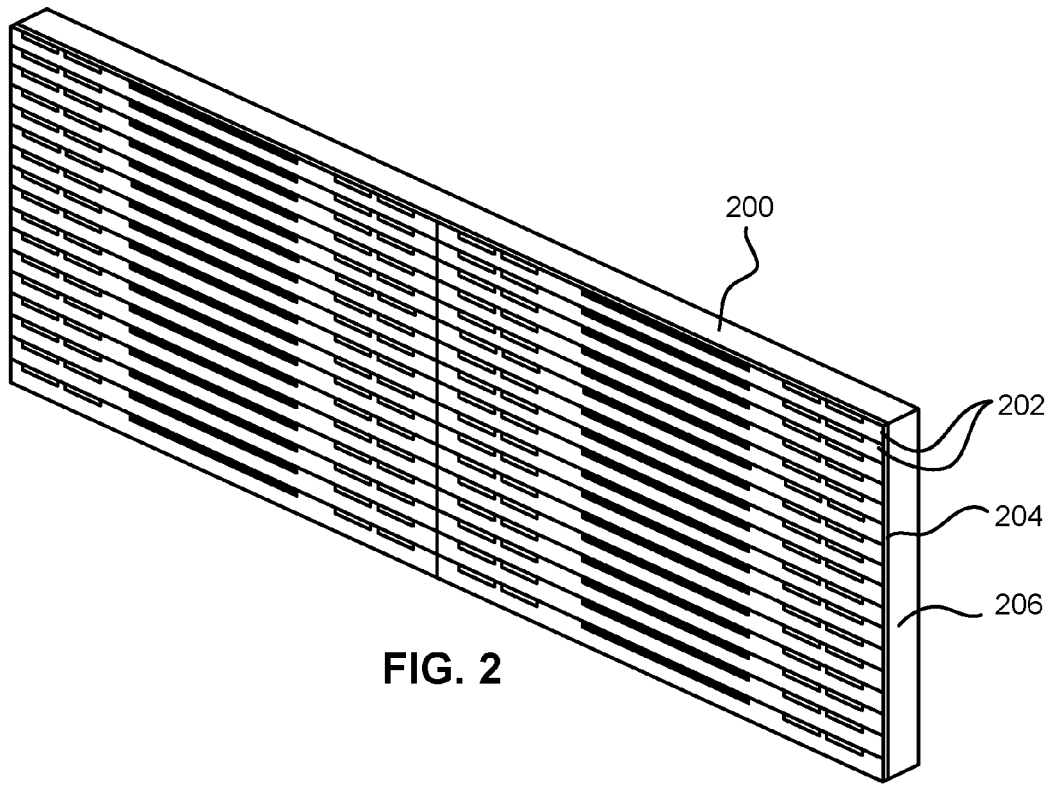
FIG. 2 is a perspective view of a section of a thin film wafer according to one embodiment.

According to the preferred method for forming the head, a wafer containing multiple "chips" each having read and/or write circuitry is formed by traditional thin film processing. The thin film wafer is cut into rectangular sections, sometimes called quads. FIG. 2 illustrates a section 200 of a thin film wafer according to one embodiment. As shown, the section 200 includes a plurality of rows 202 of circuitry formed in a layer 204 of thin films formed on a substrate 206. The section 200 will eventually be sliced and diced to form a head or chip. The circuitry may include, for example, read transducers, write transducers, servo transducers, electronic lapping guides, etc. Each row 202 can contain multiple head images. Thus, while each row contains two head images in this figure, rows built according to various embodiments may have more than two head images.

Figure 3:
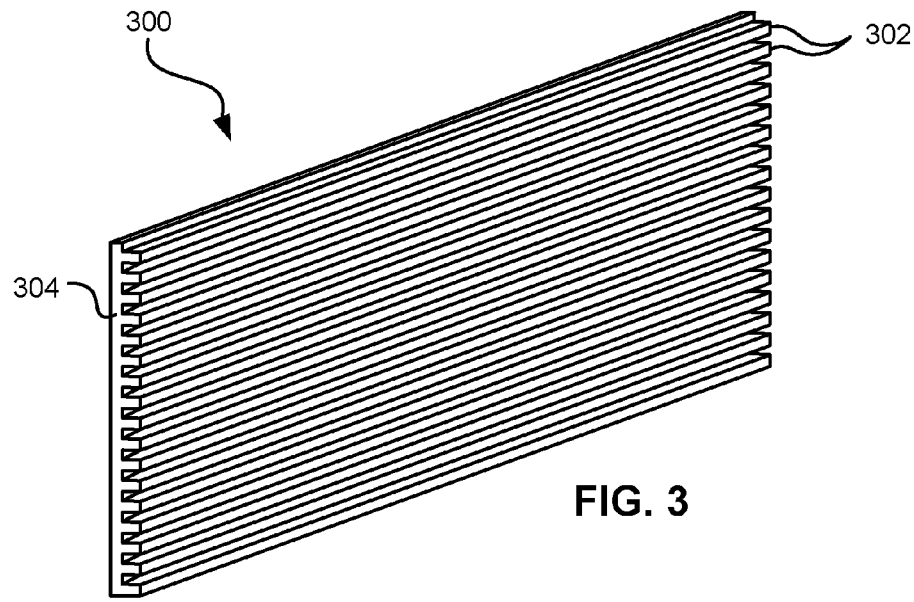
FIG. 3 is a perspective view of an array of closures.

FIG. 3 shows an array 300 of closures 302 that will be bonded to a section 200 of the wafer. The closures 302 may be of conventional construction. As shown, the closures 302 in this example extend from a top portion 304.

Figure 4:
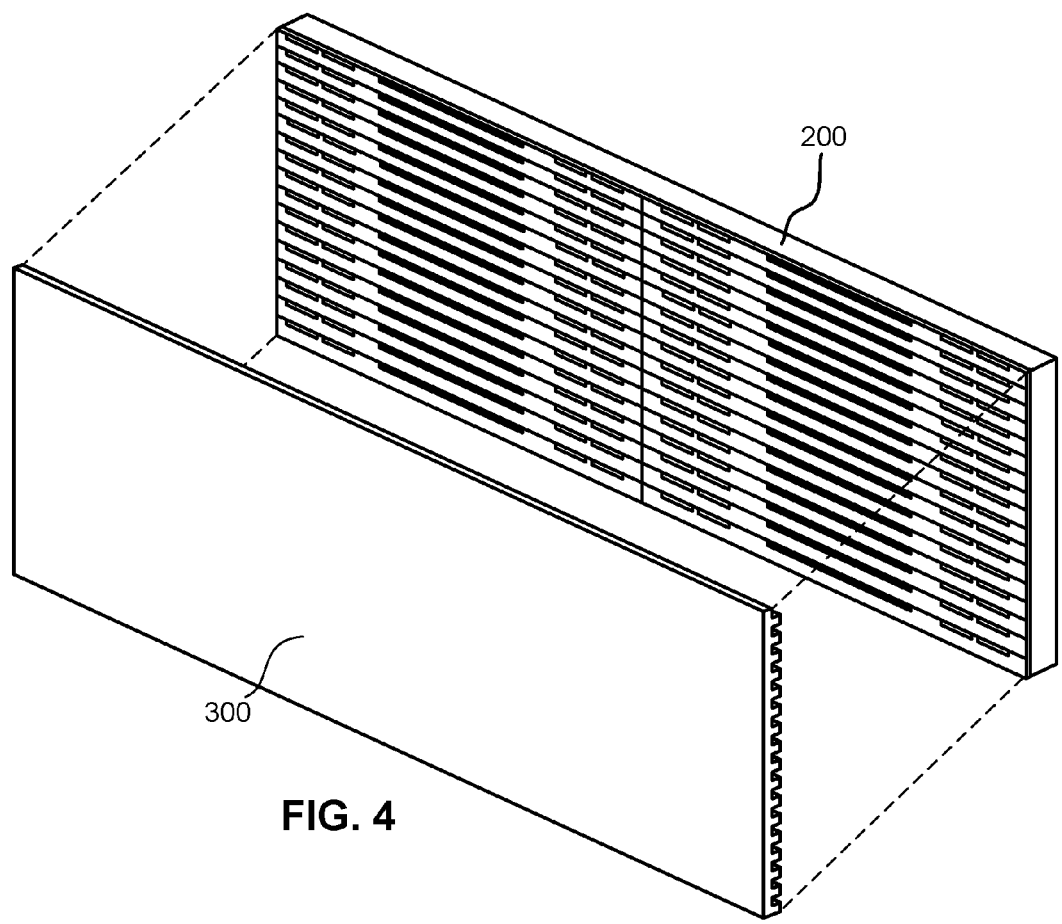
FIG. 4 is a perspective view depicting coupling of the array of closures to the section of wafer.

FIG. 4 illustrates how the array 300 is bonded to a section 200. A conventional adhesive may be used to bond the array 300 to the section 200.

Figure 5:
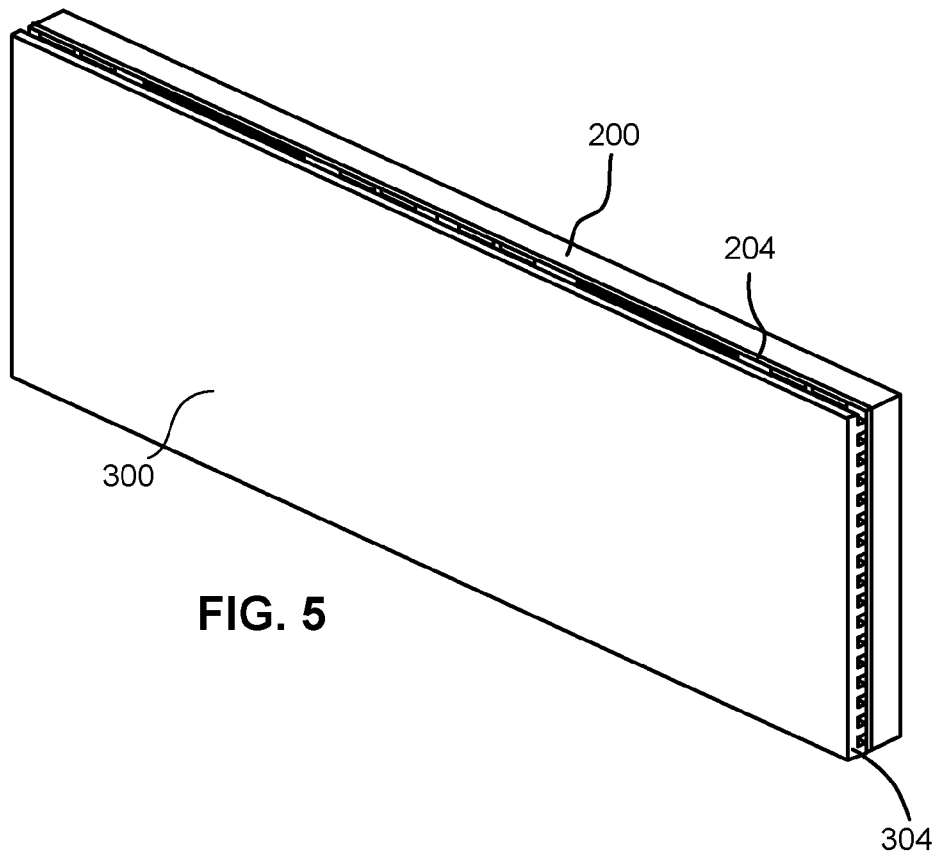
FIG. 5 is a perspective view of the array of closures coupled to the section of wafer.

FIG. 5 depicts the array 300 of closures 302 bonded to the section 200 of wafer. The top portion 304 of the array 300 of closures 302 may be removed prior to slicing the section 200 into rows 202. Portions of the closures 302 themselves may be removed as well to define the length of the tape bearing surface of each closure 302. Grinding, lapping, and/or other subtractive process may be used.

Figure 6:
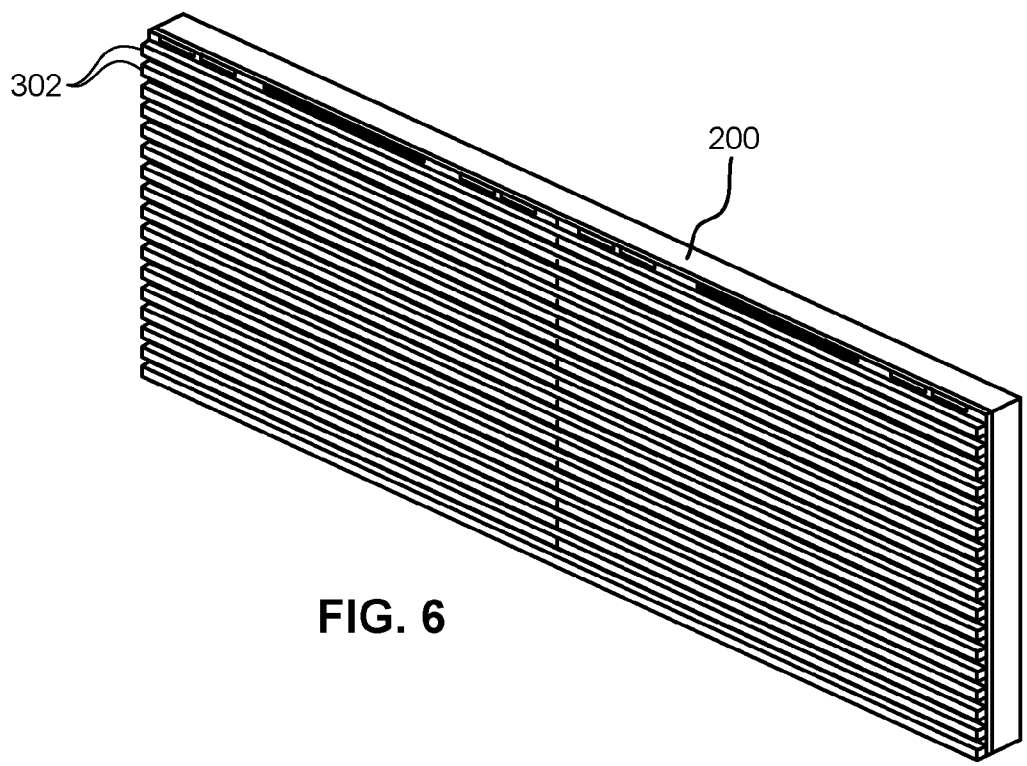
FIG. 6 is a perspective view of the closures coupled to the section of wafer upon removing a top portion of the array of closures.

FIG. 6 shows the closures 302 and section 200 with the top portion 304 of the array of closures 302 removed. The portions of the closure 302 remaining after processing support the tape as the tape passes over the head to protect the delicate electronics in the head from wear.

Figure 7:
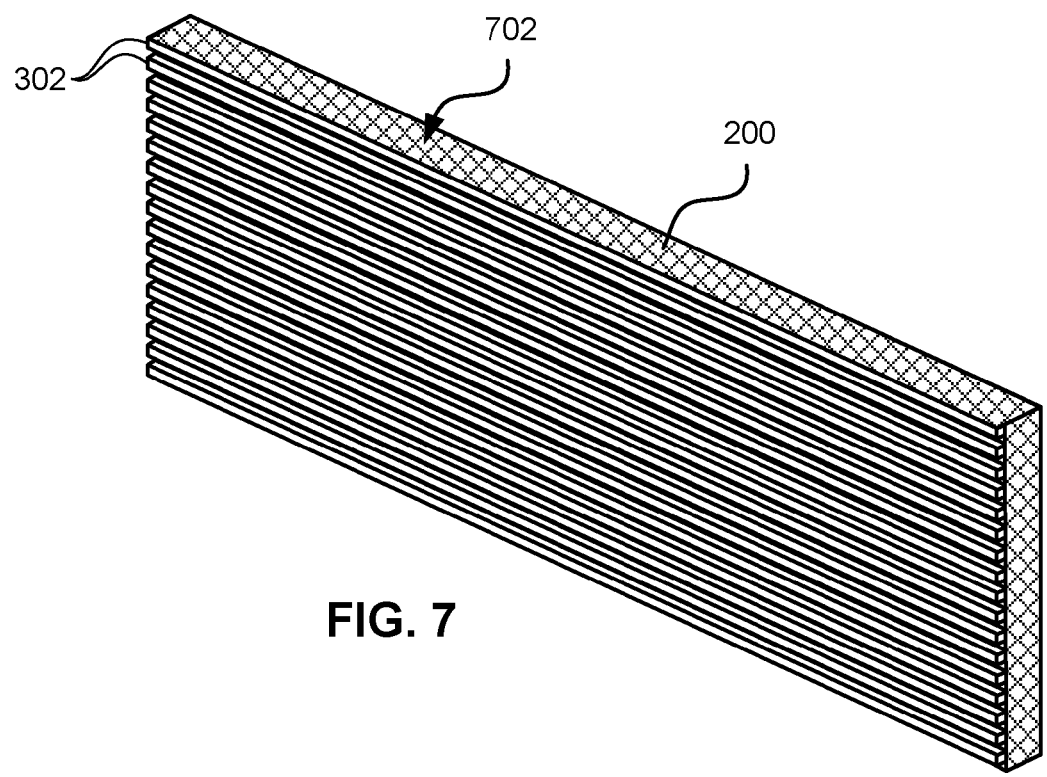
FIG. 7 is a perspective view of the section of wafer of FIG. 6 in an inverted position.

FIG. 7 shows the section 200 of FIG. 6 inverted from the orientation shown in FIG. 6.

Figure 8:
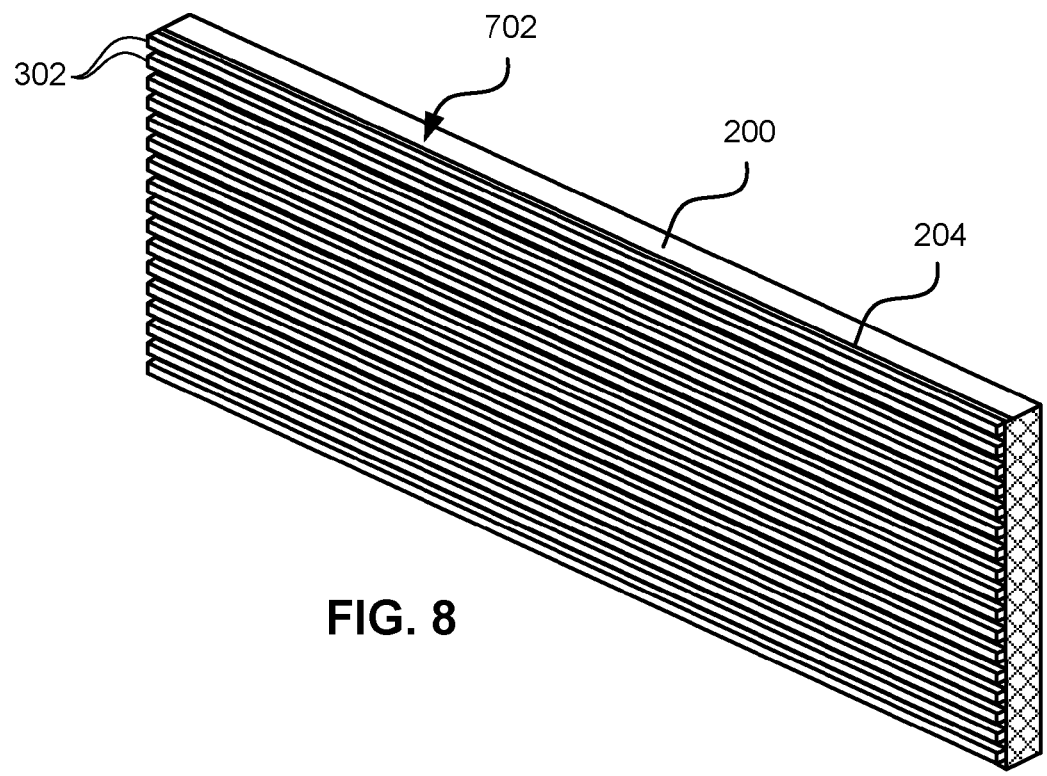
FIG. 8 is a perspective view of the section of wafer of FIG. 7 upon polishing an end thereof.

Referring to FIG. 8, the end 702 of the section 200 is lapped for setting the approximate stripe height of the transducers. Conventional lapping techniques may be used.

Figure 9:
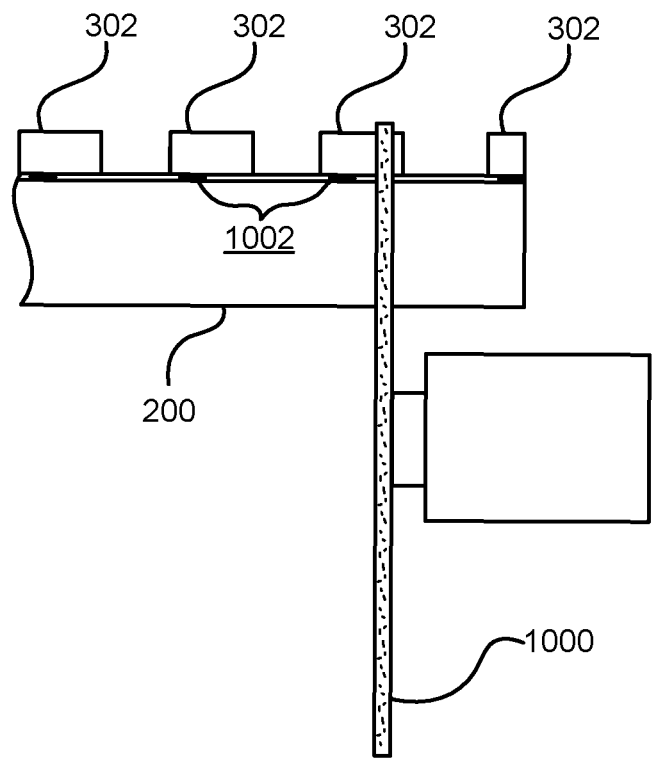
FIG. 9 is a side view depicting cutting of a row from a section of wafer.

Referring to FIG. 9, a row is then sliced from the section 200. Conventional cutting techniques may be used to slice the row from the section 200 adjacent the transducers 1002. For example, a blade 1000 of conventional construction may be used to cut through the section 200.

Figure 10:
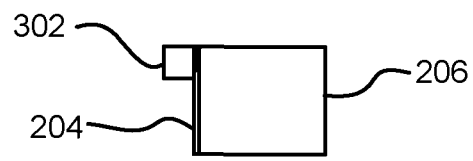
FIG. 10 is a side view of a row cut from a wafer.
Figure 11:
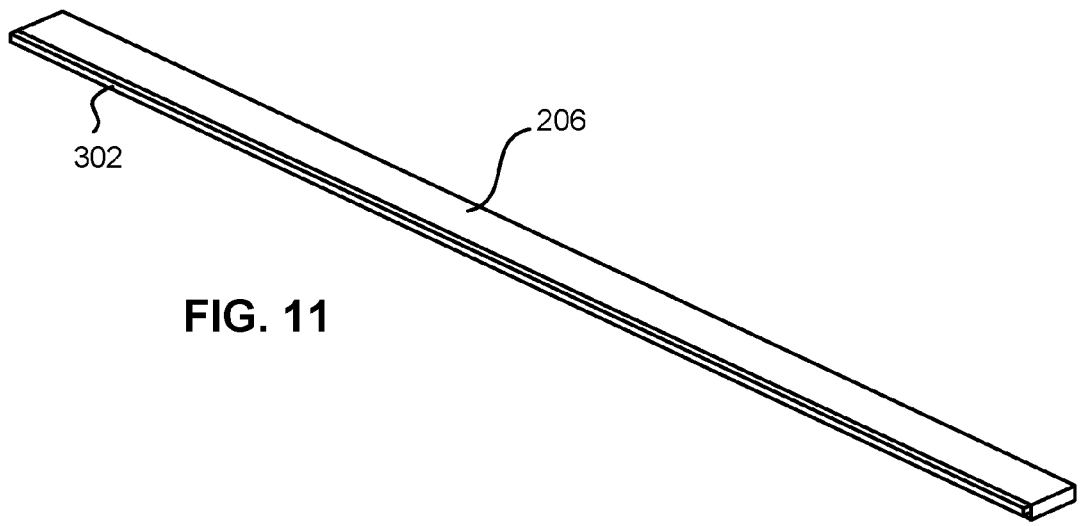
FIG. 11 is a perspective view of a row cut from a wafer after a back lap process to reduce a thickness thereof.

FIG. 10 depicts the row cut from the section 200. Various process steps may be performed on the row. For example, a back lapping step may be performed on the substrate 206 to reduce its thickness, and/or to create a smooth bottom end for subsequent processing. FIG. 11 depicts the row after back lapping.

Figure 12:
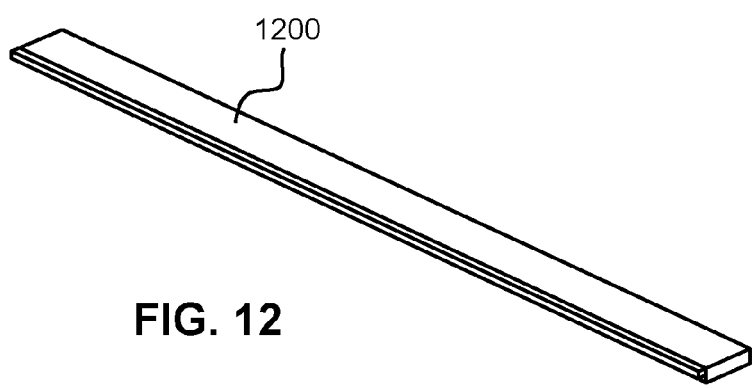
FIG. 12 is a perspective view of a chip cut from a row.

If the row includes multiple head images, the row may be cut into chips. Preferably, the rows are cut into individual thin film elements, or chips 1200, using conventional methods. See FIG. 12, which illustrates one chip 1200.

Figure 13:
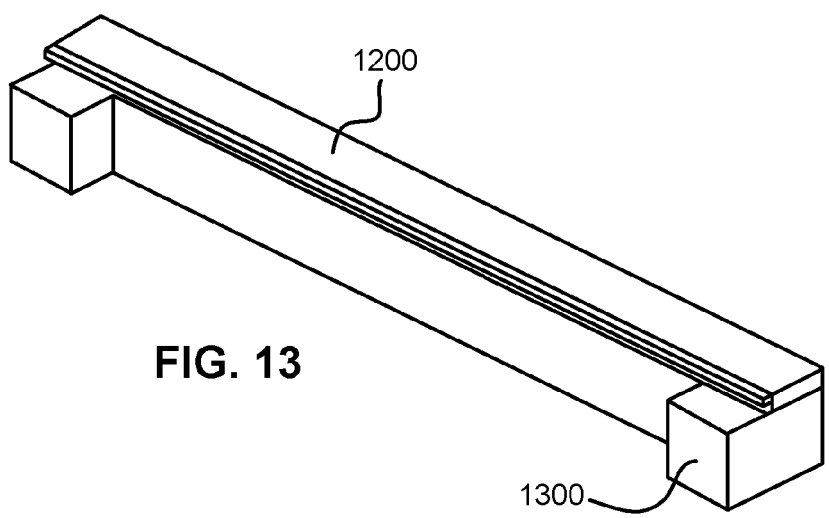
FIG. 13 is a perspective view of a U-beam with a chip coupled thereto, thereby forming a module.

Each chip 1200 may be coupled to a beam such as a U-beam 1300, as shown in FIG. 13.

Additional processes may be performed, before or after the chip 1200 is coupled to a beam. For example, the row or chip may be lapped again, using conventional techniques such as KISS lapping on a charged plate. Milling may be performed, e.g., for preparing the polished surface for application of a protective overcoat thereto. A conventional protective overcoat may be applied to the polished end.

A grinding process is performed in at least two steps. The first grinding operation is very shallow, and creates a slot 1404 that defines a tape bearing surface 1402 between an edge of the slot 1404 and the thin film layer 204. Where a portion of the circuitry of the thin film layer 204, exposed on the polished end, is used as the optical landmark for the slot positioning, the length of the tape bearing surface 1402 between the slot 1404 and that portion of the circuitry may be very accurately defined.

Any conventional mechanism for forming the slot may be used. In a preferred embodiment, a conventional grinding wheel in a system with machine vision may be used to create the slot at the proper location.

Being shallow and with the grinding wheel captive on both edges, the first grinding operation is precise and does not generate a significant cusp, where a cusp is a lip on the ground edge produced by compressive stresses during grinding. The cusp should be avoided as it tends to create non-uniform air leakage into the head-tape interface, resulting in unacceptable increase in spacing.

Figure 15:
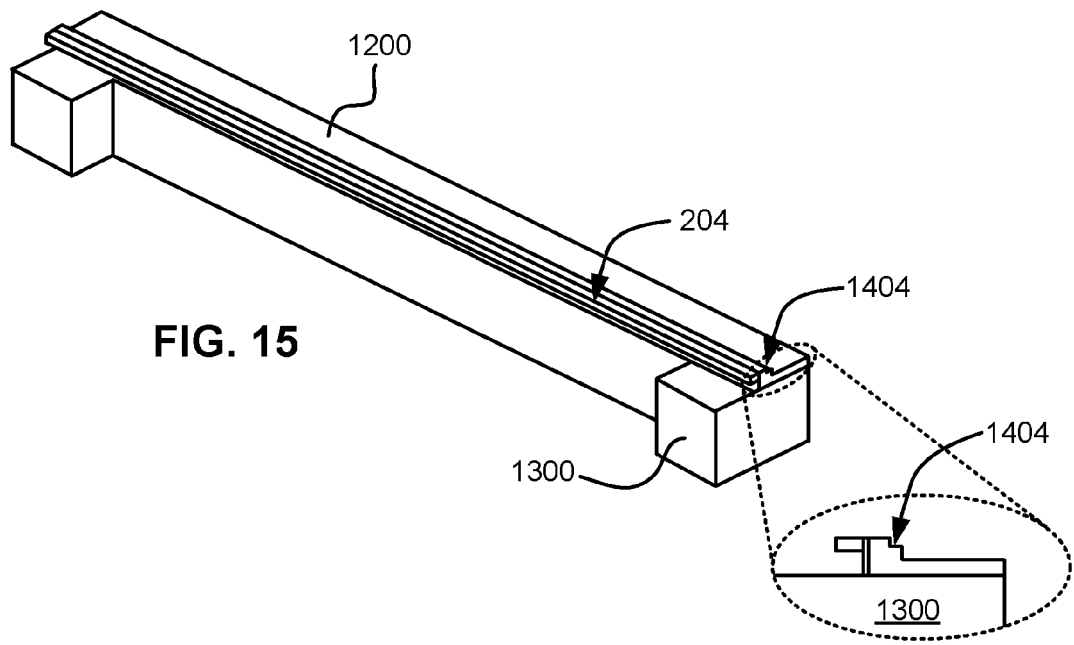
FIG. 15 is a perspective view of a module upon performing a second grinding operation.

Subsequently, a portion of the chip 1200 located on an opposite side of the slot 1404 as the circuitry in the thin film layer 204 is removed using a conventional technique such as grinding. FIG. 15 shows the chip 1200 upon removal of the material. Preferably, the removal extends along the slot 1404, thereby allowing the remaining portion of the slot 1404 to define the skiving edge of the tape bearing surface of the chip. Preferably, the second operation removes all remaining material in one pass.

Figure 14:
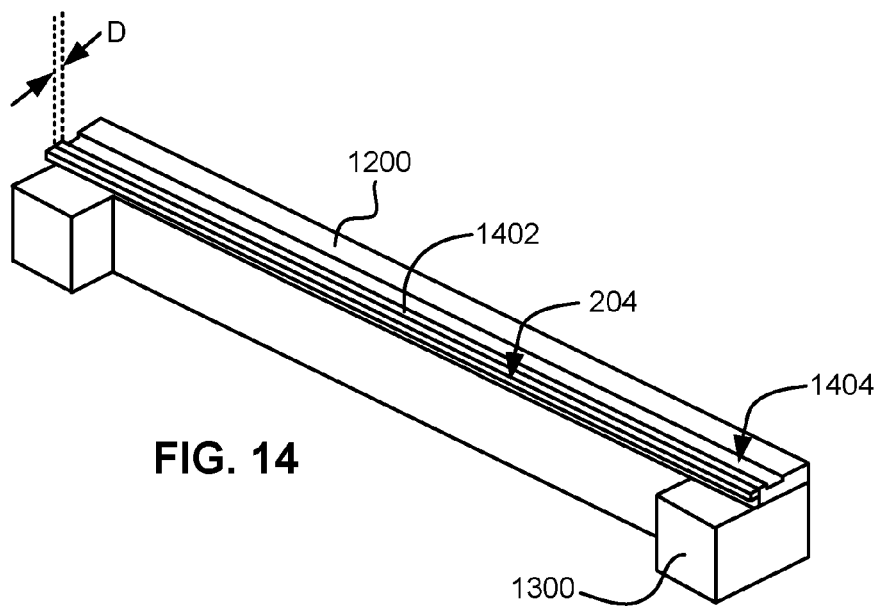
FIG. 14 is a perspective view of a module upon defining a skiving edge thereon.

Referring to FIG. 14, the slot 1404 may be located a distance D of less than about 30 microns, and preferably between about 10 and about 20 microns, from the thin film layer 204. This distance D, in combination with a wrap angle of a tape relative to the skiving edge of the bearing surface slot, is preferably short enough to induce tape tenting above the thin film layer 204 when a tape passes above the thin film layer 204. Accordingly, D is preferably less than about 50 microns. In some embodiments, D may be in a range of about 7 microns to about 30 microns. Such tape tenting may prevent asperities and other defects on the tape from engaging the thin film layer 204 and causing damage thereto such as smearing of conductive material across the sensor, thereby creating a short.

Two or more beams 1300 may eventually be coupled together to form a head.

Preferably, the closures are angled upwardly into the tape bearing surface (i.e., as they approach each other, preferably at an angle between 0.1 to 2 degrees, with respect to the horizontal line between them. The angle of the closures may be used to create an air skiving effect for close head-tape spacing and/or to create a tenting effect.

Preferably, the wrap angle between the two modules creates the desired tenting over the read transducers.

As shown in FIG. 15, the chip 1200 is at least as wide as a tape for which the tape bearing surface is designed. However, other embodiments are contemplated. For example, shorter chip may be fabricated, as described immediately below.

Figure 16:
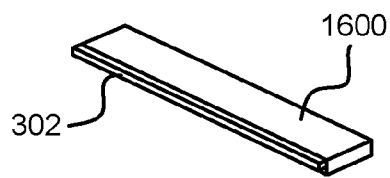
FIG. 16 is a perspective view of a chip cut from a row.

According to various embodiments, the processes described herein may be used to form a partial span flat or contoured head "chip," the chip being embeddable in a flat or contoured beam, such that the chip closure extends beyond the beam edges. For example, the rows may be cut into individual partial span heads, or chips 1600, using traditional methods. See FIG. 16, which illustrates a partial span flat profile chip 1600 according to a preferred embodiment. If the chip is to be used in a Linear Tape Open (LTO) head, the preferred length of the chip in a direction perpendicular to the direction of tape travel thereover is preferably less than about 7 to 8 mm, though larger or smaller sizes may be created as well.

Similar processes as those described above with reference to FIGS. 2-13 may be used to form the chip 1600, with the exception of the length of chip cut from the section.

Figure 17:
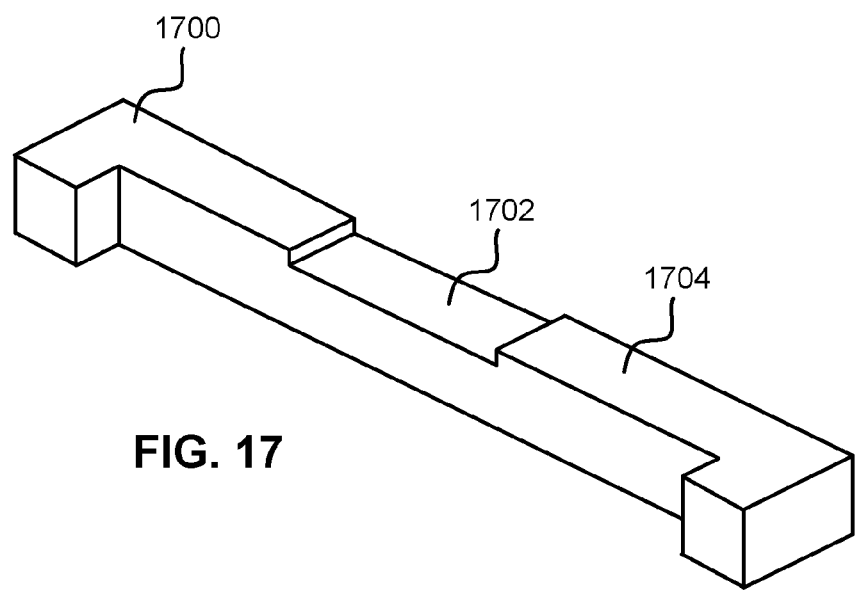
FIG. 17 is a perspective view of a U-beam.

FIG. 17 illustrates a flat profile beam (carrier) 1700 according to one embodiment. One skilled in the art will understand that many different shapes of the beam can be used. For instance, the beam may be block shaped, e.g., have a generally rectangular cross section when viewed from the tape bearing surface. The beam may also include rounded and/or tapered portions. For simplicity and ease of understanding, the following description will be described with reference to a U-shaped beam, or U-beam.

With continued reference to FIG. 17, the U-beam 1700 has a recess 1702 extending into a tape bearing surface 1704 thereof. The U-beam is preferably formed from a blank piece of wafer stock, which is inexpensive to fabricate, but is long enough to fully support the tape. If the U-beam is to be used in an LTO head, the preferred length of the U-beam in the same plane as, but in a direction perpendicular to, the direction of tape travel thereover is preferably less than about 50 mm, and ideally less than about 25 mm, but may be longer. Before the chip is affixed to the U-beam to form the module, the tape bearing surface on one of the U-beams may be lapped or polished to form a smooth tape bearing surface thereon.

Figure 18:
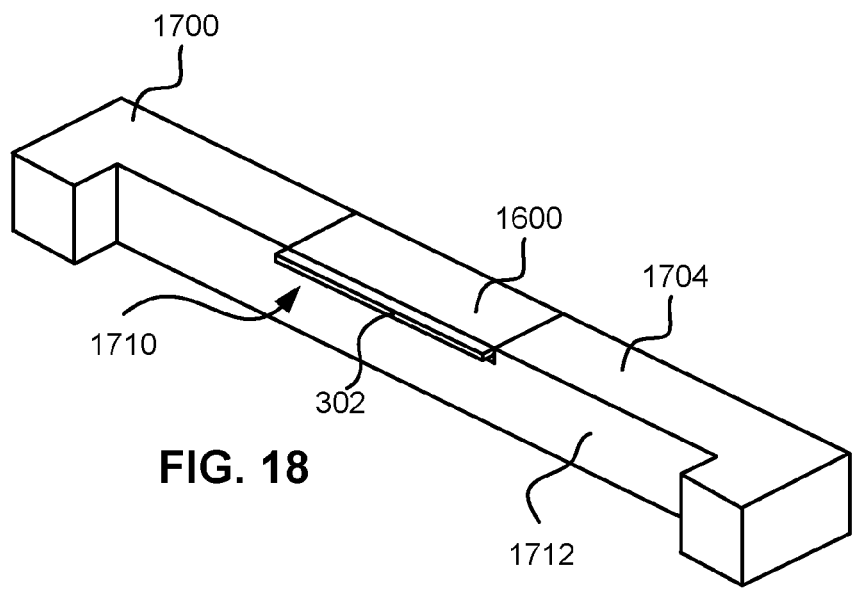
FIG. 18 is a perspective view of a U-beam with a chip coupled thereto, thereby forming a module.

As shown in FIG. 18, a chip 1600 is positioned in the recess of the U-beam such that the face 1710 of the substrate portion of the chip (which contains the device contact pads) is reasonably proximate to the adjacent face 1712 of the U-beam and coupled to the U-beam 1700 by any conventional technique, such as via an adhesive, such that the chip closure extends beyond the beam edges. This forms a module, which is later used to form a complete tape head. The geometry of the chip may be specifically adapted to minimize closure protrusion, and thereby minimize tape deflections effects.

The tape bearing surfaces (of the chip and U-beam) should be as parallel and coplanar as possible because the tape will run across them. However, the tape bearing surfaces do not need to be perfectly coplanar, as this design provides some tolerance for misalignment. Thus, the chip surface envelope may deviate from the tape bearing surface of the U-beam by several micrometers. This tolerance relief greatly reduces fabrication costs.

Figure 19:
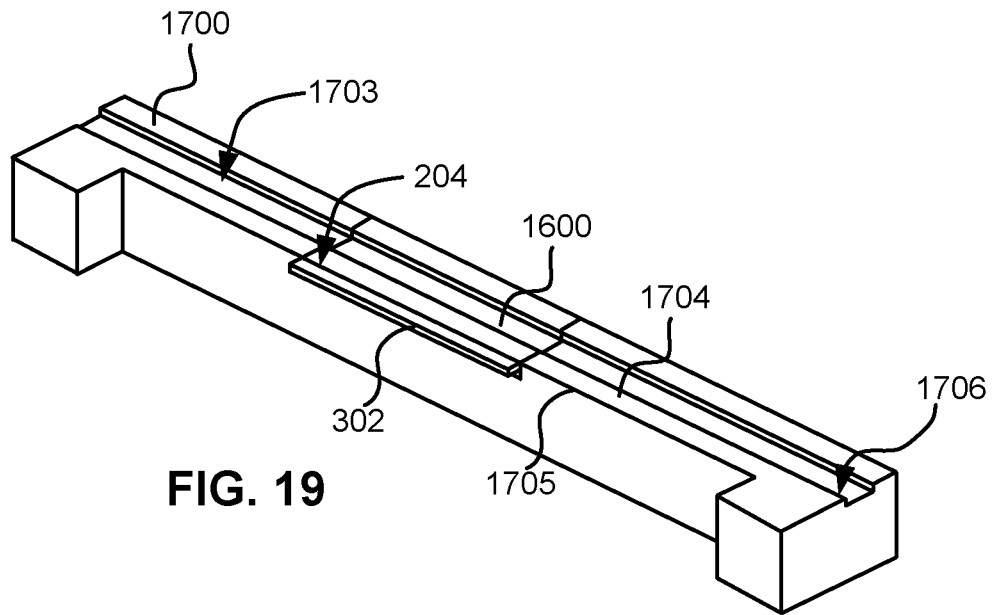
FIG. 19 is a perspective view of a module upon forming of a skiving edge thereon.

As shown in FIG. 19, the tape bearing surface of a U-beam 1700 and chip 1600 can be processed, e.g., by grinding, to form a slot 1703 that defines a skiving edge 1706, hereby defining the distance of the tape bearing surface between the skiving edge 1706 and the thin film layer 204. Such tape bearing surface may have dimensions similar to those presented above in the description of FIG. 14.

Figure 20:
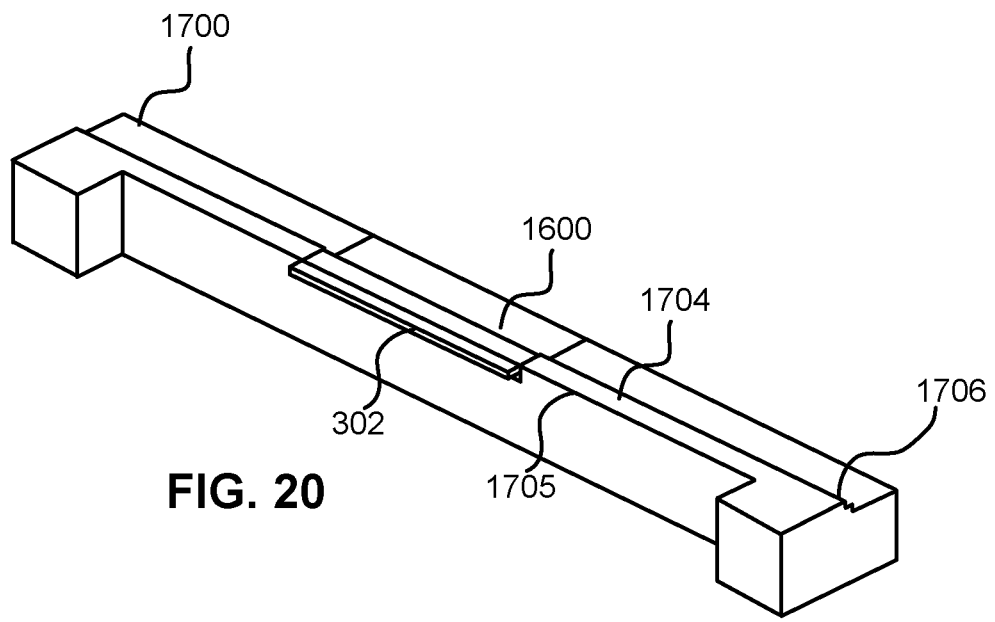
FIG. 20 is a perspective view of a module upon performing a second grinding operation.

Referring to FIG. 20, a portion of the beam 1700 and chip 1600 located on an opposite side of the slot 1703 as the circuitry in the thin film layer 204 is removed using a conventional technique such as grinding. FIG. 20 shows the beam 1700 and chip 1600 upon removal of the material. Preferably, the removal extends along the skiving edge 1706 defined by the slot 1703. The second grinding operation may remove all remaining material in one pass.

Two beams 1700 can be coupled together to form a head with spacing between the central portions of the beams, such as a head of the type shown in FIG. 1. Preferably skiving edges are formed on both modules to enable bi-directional reading and writing. In addition, the inside edges 1705 may be made sharp so that these will also skive air. Alternatively, the inside edges 1705 may be rounded if desired.

Preferably, the closures are angled upwardly into the tape bearing surface (i.e., as they approach each other, preferably at an angle between 0.1 to 2 degrees, with respect to the horizontal line between them. The angle of the closures may be used to create an air skiving effect for close head-tape spacing and/or to create a tenting effect.

Preferably, the wrap angle between the two modules creates the desired tenting over the read transducers.

All of the read and/or write elements in the head are preferably positioned in the chips. Note that each chip can have multiple read and write elements, such as interleaved read/write elements. Alternatively, one chip can have all write elements and the other chip can have all read elements. Other combinations are also possible. In this way, a read/write head can be formed.

Figure 21:
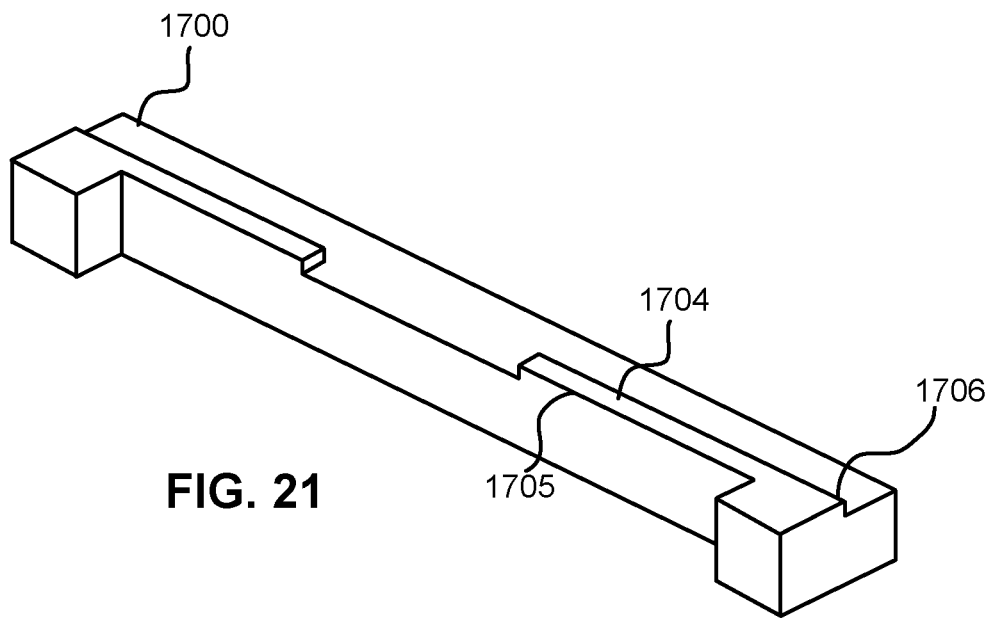
FIG. 21 is a perspective view of a U-beam according to one embodiment.
Figure 22:
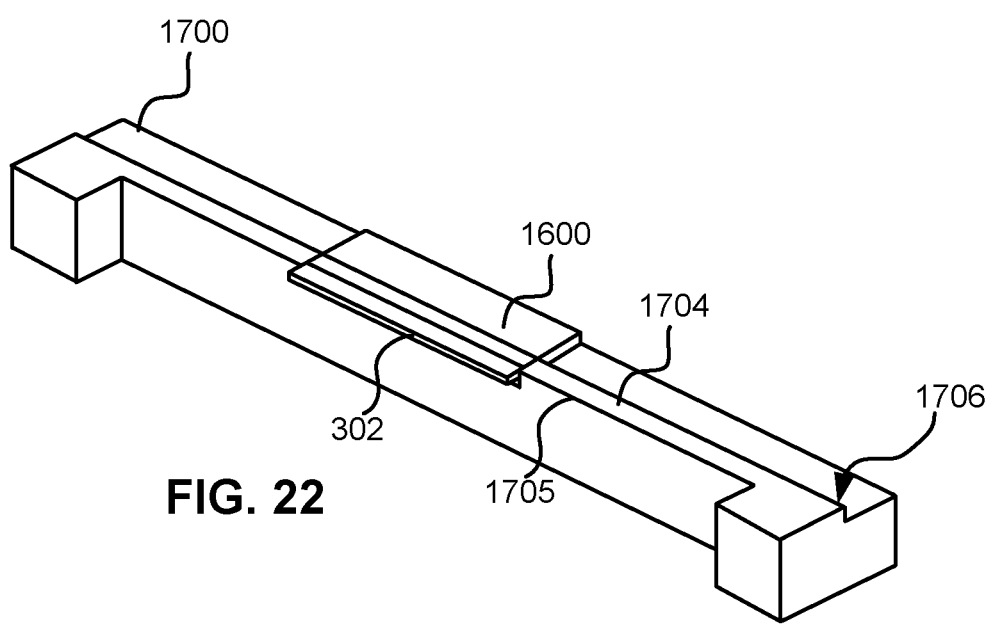
FIG. 22 is a perspective view of a U-beam with a chip coupled thereto, thereby forming a module.
Figure 23:
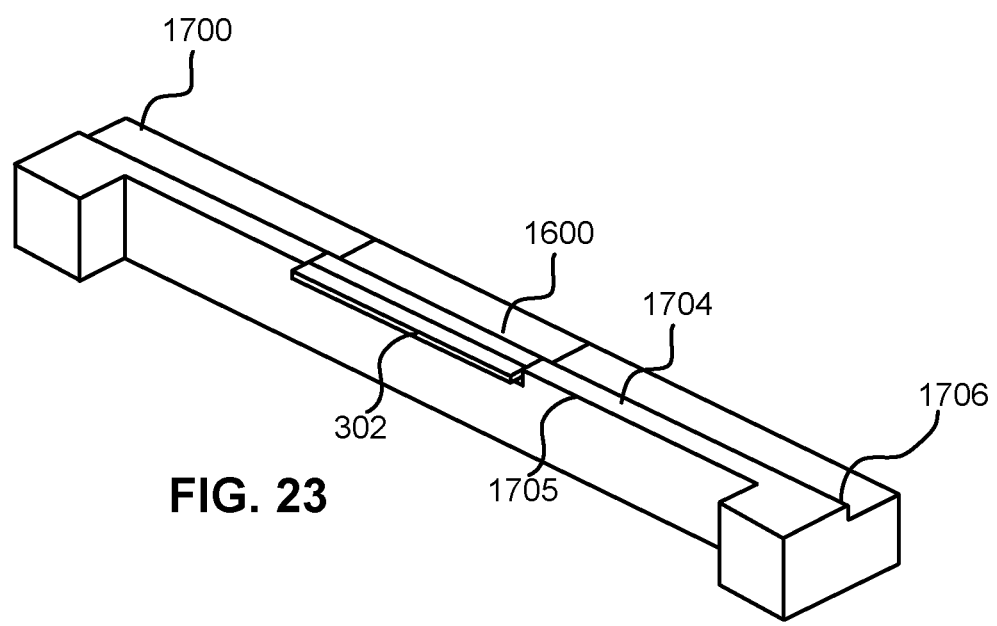
FIG. 23 is a perspective view of a module upon forming of a skiving edge thereon.

FIGS. 21-23 illustrate an alternate embodiment having components similar to those of FIGS. 16-20, and accordingly have common numbering therewith. As shown in FIG. 21, the beam 1700 has a rear skiving edge 1706 already formed thereon. In FIG. 22, the chip 1600 is coupled to the beam 1700. FIG. 23 shows the module after a portion of the chip 1600 behind the bearing surface slot is removed by a multi-step grinding process.

The heads created by the processes described herein can be used in magnetic recording heads for any type of magnetic media, including but not limited to disk media, magnetic tape, etc.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. A method, comprising:
forming a slot on a tape bearing surface of at least a chip having a thin film layer with a plurality of transducers therein, the slot defining a skiving edge; and
performing a second operation on the tape bearing surface of at least the chip for removing a portion of the chip positioned on an opposite side of the slot as the transducers,
wherein the chip has a widest width that is less than a width of a tape for which the tape bearing surface is designed,
wherein the chip is inserted in a recess of a beam, wherein the slot is created in only the chip.

2. The method as recited in claim 1, comprising:
lapping an end of a section of a thin film wafer for polishing the end of the section, the section having a plurality of rows of the transducers formed on a substrate;
slicing a row from the section, the row having the polished end; and
cutting the chip from the row.

3. The method as recited in claim 2, comprising coupling closures to the section on an opposite side of the transducers as the substrate.

4. The method as recited in claim 1, comprising using optical detection of a reflective feature in the tape bearing surface to determine a location for the slot.

5. The method as recited in claim 1, wherein the second operation removes, from only the chip, a portion thereof on an opposite side of the slot as the transducers.

6. The method as recited in claim 1, comprising adding a protective coating to at least the chip prior to forming the slot.

7. A method, comprising:
forming a slot on a tape bearing surface of a beam and a chip in a recess of the beam, the chip having a thin film layer with a plurality of transducers therein, the slot defining a skiving edge; and
performing a second operation on the tape bearing surface of the chip and beam, for removing a portion of the chip and beam positioned on an opposite side of the slot as the transducers,
wherein a depth of material removed is greater than a depth of the slot,
wherein the chip has a widest width that is less than a widest width of the beam.

8. The method as recited in claim 7, wherein a portion of the slot remains to define a skiving edge of the tape bearing surface, wherein only a portion of a bottom of the slot is removed during the second operation.

9. The method as recited in claim 7, wherein the chip is inserted in a recess of a beam, wherein the slot is created in only the chip.

10. The method as recited in claim 7, comprising:
lapping an end of a section of a thin film wafer for polishing the end of the section, the section having a plurality of rows of the transducers formed on a substrate;
slicing a row from the section, the row having the polished end; and
cutting the chip from the row.

11. The method as recited in claim 10, comprising coupling closures to the section on an opposite side of the transducers as the substrate.

12. The method as recited in claim 7, comprising using optical detection of a reflective feature in the tape bearing surface to determine a location for the slot.

13. A method, comprising:
coupling closures to a section of a thin film wafer having a plurality of rows of transducers formed on a substrate, the closures being coupled to the section on an opposite side of the transducers as the substrate;
lapping an end of the section for polishing the end of the section and the closure;
slicing a row from the section, the row having the polished end; and
using optical detection of a reflective feature on the polished end to determine a location for a slot;
forming the slot in the polished end at the determined location, a tape bearing surface being defined between the slot and portions of the transducers visibly exposed on the polished end;
removing, from the row or segment thereof, a portion of the polished end located on an opposite side of the slot as the transducers;
cutting a chip from the row or segment thereof; and
inserting the chip in a recess of a beam, wherein the slot is created in only the chip.

14. The method as recited in claim 13, comprising coupling at least a portion of the row to a beam.

15. The method as recited in claim 14, wherein the portion of the row is at least as wide as a tape for which the tape bearing surface is designed.

16. The method as recited in claim 14, wherein the at least a portion of the row is less than a width of a tape for which the tape bearing surface is designed.

17. The method as recited in claim 13, wherein the slot defines a skiving edge of the tape bearing surface.

* * * * *